United States Patent
Diep et al.

(10) Patent No.: US 8,117,315 B2
(45) Date of Patent: Feb. 14, 2012

(54) APPARATUS, SYSTEM, AND METHOD FOR ARCHIVING SMALL OBJECTS TO IMPROVE THE LOADING TIME OF A WEB PAGE

(75) Inventors: Catherine C. Diep, Cupertino, CA (US); Xing X. Fang, Haidian (CN); Dong J. Lan, Beijing (CN); Sheng Lu, Haidian (CN); Luis J. Ostdiek, San Francisco, CA (US); Qing B. Wang, Haidain (CN); Meng Ye, AnNinZhuang XiLu (CN)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/781,066

(22) Filed: Jul. 20, 2007

(65) Prior Publication Data
US 2009/0024982 A1    Jan. 22, 2009

(51) Int. Cl.
G06F 15/173 (2006.01)

(52) U.S. Cl. ........ 709/227; 709/201; 709/203; 707/661; 382/232; 382/233; 382/235

(58) Field of Classification Search ............... 709/227
See application file for complete search history.

(56) References Cited

U.S. PATENT DOCUMENTS

| | | | | |
|---|---|---|---|---|
| 6,185,625 | B1 | 2/2001 | Tso et al. | 709/247 |
| 6,195,692 | B1 * | 2/2001 | Hsu | 725/110 |
| 6,427,149 | B1 * | 7/2002 | Rodriguez et al. | 709/219 |
| 6,560,618 | B1 * | 5/2003 | Ims | 707/999.01 |
| 6,915,328 | B2 | 7/2005 | Turnbill | 709/203 |
| 6,928,471 | B2 | 8/2005 | Pabari et al. | 709/223 |
| 6,947,440 | B2 * | 9/2005 | Chatterjee et al. | 709/219 |
| 7,031,968 | B2 * | 4/2006 | Kremer et al. | 707/100 |
| 7,032,183 | B2 | 4/2006 | Durham | 715/823 |
| 7,047,318 | B1 | 5/2006 | Svedloff | 709/246 |
| 7,099,927 | B2 | 8/2006 | Cudd et al. | 709/217 |
| 7,231,644 | B2 * | 6/2007 | Kieffer | 719/331 |
| 7,349,944 | B2 * | 3/2008 | Vernon et al. | 709/217 |
| 2002/0025001 | A1 * | 2/2002 | Ismaeil et al. | 375/240.16 |
| 2002/0029228 | A1 | 3/2002 | Rodriguez et al. | 707/204 |

(Continued)

OTHER PUBLICATIONS

Wills et al, "Using Bundles for Web Content Delivery" Computer Networks, Elsevier Science Publishers B.V., Amersterdam, NL, vol. 42, No. 6, Aug. 21, 2003, pp. 797-817.

Eng Huat Ng et al.; Web Page Reuse Techniques: A Dynamic Referential Navigational Guide, E-Commerce Group, 2000.

(Continued)

*Primary Examiner* — Dohm Chankong
*Assistant Examiner* — Neeraj Utreja
(74) *Attorney, Agent, or Firm* — Kunzler Needham Massey & Thorpe (57) ABSTRACT

An apparatus, system, and method are disclosed for improving the loading time of a web page. The present invention includes selecting archivable objects in a web page for inclusion in an archive file, the web page referencing at least one archivable object and generating the archive file from the selected archivable objects. A web page is generated, the web page configured to display in a script enabled web browser, wherein the web page comprises executable code configured to retrieve the archive file, executable code configured to unpackage the archivable objects from the archive file, and executable code configured to render the web page in a web browser using the unpackaged archivable objects from the archive file. Beneficially, the apparatus, system, and method improve the load time for web pages.

23 Claims, 8 Drawing Sheets

U.S. PATENT DOCUMENTS

| | | | |
|---|---|---|---|
| 2002/0065800 A1 | 5/2002 | Morlitz | |
| 2002/0083097 A1 | 6/2002 | Warrington | 707/513 |
| 2002/0147735 A1* | 10/2002 | Nir | 707/200 |
| 2002/0188728 A1 | 12/2002 | Ballard | |
| 2003/0033448 A1 | 2/2003 | Kieffer | 709/331 |
| 2003/0200175 A1* | 10/2003 | Wang et al. | 705/50 |
| 2004/0034647 A1 | 2/2004 | Paxton et al. | 707/102 |
| 2004/0073670 A1* | 4/2004 | Chack | 709/225 |
| 2004/0103215 A1 | 5/2004 | Ernst et al. | 709/247 |
| 2004/0255233 A1 | 12/2004 | Croney et al. | 715/500 |
| 2005/0044490 A1 | 2/2005 | Massasso et al. | 715/517 |
| 2005/0065800 A1 | 3/2005 | Green et al. | 705/1 |
| 2005/0108259 A1 | 5/2005 | Watanabe et al. | 707/100 |
| 2005/0180661 A1* | 8/2005 | El Bernoussi et al. | 382/317 |
| 2006/0053180 A1* | 3/2006 | Alon et al. | 707/204 |
| 2006/0143714 A1* | 6/2006 | Peterson et al. | 726/26 |
| 2006/0235906 A1 | 10/2006 | Brinkmoeller et al. | 707/204 |
| 2007/0233898 A1* | 10/2007 | Raviv et al. | 709/238 |

OTHER PUBLICATIONS

Loukopoulos, T. et al., "Optimizing Download Time of Embedded Multimedia objects for Web Browsing," AN-8131964, Hong Kong University, Hong Kong, Oct. 2004.

Rodriguez, P. et al., "Session Level Techniques for Improving Web Browsing Performance on Wireless Links", Microsoft research, Bell Lab, May 2004.

Olshefski, D. et al., "Understanding the Management of Client Perceived Response Time", IBM research, Columbia University, Jun. 2006.

Lai, Am. et al., "Improving Web Browsing on Wireless PDAs Using Thin-Client Computing", Columbia University, May 2004.

Dufour, B. et al., "Dynamic Metrics for Java", McGill University, Oct. 2003.

Final Office Action received from USPTO, U.S. Appl. No. 11/847,287, received Mar. 17, 2010.

* cited by examiner

APPARATUS, SYSTEM, AND METHOD FOR ARCHIVING SMALL OBJECTS TO IMPROVE THE LOADING TIME OF A WEB PAGE

This application is related to the U.S. Patent Applications entitled "Apparatus, System, and Method for Cooperation Between a Browser and a Server to Package Small Objects in one or more Archives" to Long Cheng, Catherine C. Diep, Dong Jun Lan, Sheng Lu, Luis J. Ostdiek, Qing Bo Wang, and Meng Ye having Ser. No. 11/847,287 and filed on Aug. 29, 2007 and "Apparatus, System, and Method for Cooperation Between a Browser and a Server to Package Small Objects in one or more Archives" to Long Cheng, Catherine C. Diep, Dong Jun Lan, Sheng Lu, Luis J. Ostdiek, Qing Bo Wang, and Meng Ye having Ser. No. 11/847,299 and filed on Aug. 29, 2007.

BACKGROUND OF THE INVENTION

1. Field of the Invention

This invention relates to web pages and more particularly relates to improving load times for web pages.

2. Description of the Related Art

The Internet has emerged as s the default platform for business and personal application development. Unfortunately the demand to build Internet applications of increasing usability has magnified the adoption of multimedia technology to represent a better user experience. The result is that a normal web page usually comprises a large number of image resources, executable scripts and style definitions. The file size of each of these resources is small, usually less than 1K. When these small resources are deployed on web servers, they typically have high overhead requirements, resulting in relatively high demands on network bandwidth and server workload.

The network overhead requirements of the resources include protocol headers, HTTP headers, TCP headers, and IP headers. The average HTTP header is more than 300 bytes for a single HTTP request or response, thus in one request/response interaction, there are more than 600 to 700 bytes HTTP of headers. As stated above, the size of objects in many web pages is already very small, so the unnecessary cost of HTTP headers is considerable. The smaller the object is, the larger the overhead ratio is. Since the headers contributing to the overhead requirements of each request are a fundamental part of the current structure of the Internet, little can be done to reduce them.

In addition to delays caused by overhead, when a web page is accessed by a browser, the browser sends a request for each object in the web page and waits for a response for each object. This creates another "round-trip time" delay that compounds the overhead delays caused by headers and the like. When a web page consists of many small objects, the wait times for the objects are cumulative and further delay loading.

SUMMARY OF THE INVENTION

From the foregoing discussion, it should be apparent that a need exists for an apparatus, system, and method that reduces header overhead and round-trip wait times for loading web pages. Beneficially, such an apparatus, system, and method would reduce the time required to load a web page.

The present invention has been developed in response to the present state of the art, and in particular, in response to the problems and needs in the art that have not yet been fully solved by currently available web page delivery schemes. Accordingly, the present invention has been developed to provide an apparatus, system, and method for improving the loading time of a web page that overcomes many or all of the above-discussed shortcomings in the art.

A computer program product comprising a computer readable medium having computer usable program code programmed for improving the loading time of a web page is provided. The operations of the computer program product comprise selecting archivable objects in a web page for inclusion in an archive file, the web page referencing at least one archivable object, generating the archive file from the selected archivable objects, and generating a web page configured to display in a script enabled web browser. The web page generated by the computer program product may comprise executable code configured to retrieve the archive file, executable code configured to unpackage the archivable objects from the archive file, and executable code configured to render the web page in a web browser using the unpackaged archivable objects from the archive file The computer program product, in one embodiment, is configured to generate a web page by rewriting an existing web page. In another embodiment, the computer program product may further include operations to scan a document object model (DOM) tree of the web page to determine the objects in the web page. In a further embodiment, the computer program product may be configured such that selecting archivable objects from the web page further comprises selecting archivable objects wherein each archivable object selected has a size less than a threshold value. The threshold value, in one embodiment, is three kilobytes.

In one embodiment of the computer program product, selecting archivable objects from the web page further comprises selecting archivable objects such that the generated archive file is less than one quarter a size of the web page. In another embodiment of the computer program product, selecting archivable objects from the web page further comprises prioritizing archivable objects for inclusion in the archive file based on one or more prioritization criteria.

The one or more prioritization criteria in the computer program product may comprise a number of descendent objects of the archivable object in a document object model (DOM) tree. In another embodiment, the one or more prioritization criteria in the computer program product may comprise a hierarchical level of the archivable object in a DOM tree. In a further embodiment of the computer program product, generating the archive file further comprises ordering the archivable objects in the archive file according to the prioritization of the archivable objects.

A system of the present invention is also presented to improve the loading time of a web page. The system may be embodied by an archiver, a web server application, and a web host. In particular, the system, in one embodiment, includes an archiver comprising a selection module, an archive generator module, and a web page generator module. The selection may be configured to select archivable objects in a web page for inclusion in an archive file, the web page referencing at least one archivable object. The archive generator module may be configured to generate the archive file from the selected archivable objects.

The web page generator module may be configured to generate a web page, the generated web page configured to display in a script enabled web browser. Generating a web page may comprise inserting executable code into the generated web page configured to retrieve the archive file, inserting executable code into the generated web page configured to unpackage the archivable objects from the archive file, and inserting executable code into the generated web page configured to render the generated web page using the unpackaged archivable objects from the archive file.

In one embodiment, the web server application in the system is configured to deliver the generated web page and the archive file over a network. The web host in the system may be configured to operate the web server application, the computing device accessible over a network, the computing device comprising a central processing unit and memory.

The web page generator module in the system may be further configured to remove direct links to selected archivable objects from the generated web page. In another embodiment of the system, the generated web page is a master page. In a further embodiment, the web page generator module rewrites a sub page to use an archivable object from an archive file retrieved for a master page. The archive generator module, in one embodiment, compresses the archive file in response to a determination that a proportion of images in the archive is below a threshold level.

A method of the present invention is also presented for deploying computing infrastructure comprising integrating computer-readable code into a computing system. The code in combination with the computing system of the method in the disclosed embodiments is substantially capable of performing the functions presented above with respect to the operation of the described computer program product and system. In one embodiment, the method includes selecting archivable objects in a web page for inclusion in an archive file wherein each archivable object selected has a size less than a threshold value and wherein each archivable object selected is prioritized according to one or more prioritization criteria.

The method also may include generating the archive file from the selected archivable objects wherein the archivable objects in the archive file are ordered according to the priority of the archivable objects. In a further embodiment, the method includes rewriting a web page configured to display in a script enabled web browser. The rewritten web page may comprise executable code configured to retrieve the archive file, executable code configured to unpackage the archivable objects from the archive file, and executable code configured to render the web page in a web browser using the unpackaged archivable objects from the archive file.

In one embodiment of the method, the web page is a static web page. In a further embodiment, the method includes generating one or more archive files for a web page before a request for the web page is received. The method may include generating an archive file dynamically for a dynamically generated web page. In a further embodiment, the archive file is generated in response to a determination that a measure of computational cost for generating the archive file for a dynamic web page is less than a threshold value.

A computer program product comprising a computer readable medium having computer usable program code programmed for improving the loading time of a web page is provided. The operations of the computer program product include requesting a web page having archivable objects for inclusion in an archive file and receiving a generated web page, the web page having executable code configured to retrieve the archive file, unpackage the archivable objects from the archive file, and render the web page in a web browser using the unpackaged archivable objects from the archive file.

In one embodiment, the computer program product includes operations for executing code to retrieve the archive file, executing code to unpackage the archivable objects from the archive file, and executing code to render the web page in a web browser using the unpackaged archivable objects from the archive file. The computer program product may further include operations for decompressing a compressed archive file.

Executing code to render the web page, in one embodiment, includes rendering an archivable object in a sub page from an archive file downloaded for a master page. In another embodiment, executing code to unpackage the archivable objects from the archive file further comprises unpackaging the archivable objects in order.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors that communicate with different forms of memory. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
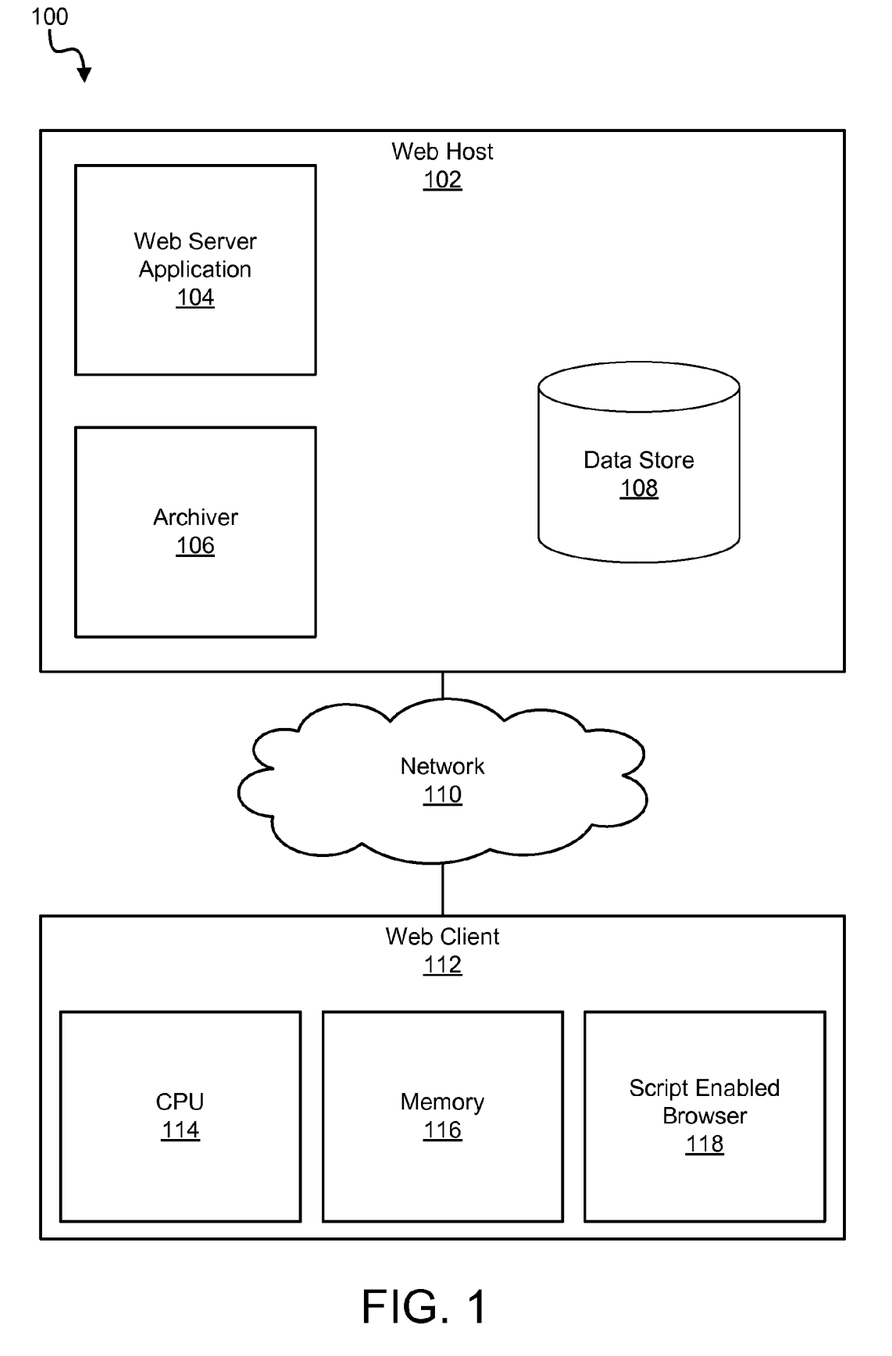
FIG. 1 is a schematic block diagram illustrating one embodiment of a system for improving the download time of a web page in accordance with the present invention.

FIG. 1 depicts one embodiment of a system 100 for improving the download time of a web page. The system 100 may include a web host 102 with a web server application 104, an archiver 106, and a data store 108. The system 100 may further include a network 110 and a web client 112 with a central processing unit (CPU) 114, memory 116, and a script enabled browser 118. The system 100 generates web pages readable by a script enabled browser 118 with archives for improved download time.

The web host 102, in one embodiment, includes hardware and software components for providing web pages to a web client 112. The web host may include a web server application 104, an archiver 106, and a data store 108. The web host 102 may be accessible over a network 110.

The web host 102, in one embodiment, includes a web server application 104. The web server application 104 comprises software configured to deliver web pages over a network. The web server application 104 may be configured to deliver a web page that complies with accepted standards, such as hypertext markup language (HTML) files. Other examples of standards compliant web pages include extensible hypertext markup language (XHTML), hypertext preprocessor (PHP), worldwide web consortium (W3C), and the like. Examples of web server applications include Apache HTTP Server, Microsoft® Internet Information Server®, IBM® HTTP Server, and the like.

The web server application 104, in one embodiment, may be further configured to deliver archive files associated with web pages. In one embodiment, these archive files comprise objects needed to render the web page. Archive files are described in more detail in relation to the archiver 106 below and later in this document.

In one embodiment, the archiver 106 generates web pages optimized for improved downloading times. The archiver 106 may generate one or more archive files from objects referenced in the web page. The archive files each consist of a plurality of objects referenced in the web page. When the archive file is sent to the web client 112, it may include a single header in place of the multiple headers that would have been transmitted with the objects if an archive was not used. Since each of the one or more archive files include multiple objects, and the archive file may be transmitted with a single header in place of the headers for each of the objects in the archive file, the total size of required headers is reduced.

The web server application 104 may then deliver the single archive file in place of each of the individual objects referenced in the web page. Since each object in the archive file no longer requires an individual header, and there is no separate wait time associated with each individual object, the overall download time for the web page is reduced.

The web pages generated by the archiver 106, in one embodiment, are capable of being rendered by a standard browser without any changes to the browser or its supporting code. The browser, in one embodiment, is script enabled, meaning that the browser is capable of processing code written in a scripting language such as Javascript™, VBScript™, a java applet, or the like. The generated web pages may be standards compliant. For example, the generated web pages may comprise HTML files and include executable code or references to executable code configured to handle an associated archive file. The executable code may be any type of executable code capable of handling the archive files, such as Javascript™, VBScript™, ActiveX™, or the like. How the executable code handles the archive files is described below in relation to FIG. 6.

The archiver 106, in one embodiment, may generate a web page for a static web page. Static web pages are web page with content that does not change in response to parameters associated with the web page. The archiver 106 may generate one or more archive files using objects associated with the static web page. In one embodiment, the archiver 106 may generate a web page for a static web page in response to a request for the web page by the web client 112.

In another embodiment, the archiver 106 may generate a web page for a static web page asynchronously with a request for the web page by the web client 112. The archiver 106 may generate one or more archive files for the web page. The generated web page and the one or more archive files for the web page may be stored for access by the web host 102. A request for a static web page may result in the delivery of a generated web page and archive file generated before the request for the web page. In this embodiment, the archiver 106 may generate web pages and archive files while the web host 102 is not under a heavy load.

In another embodiment, the archiver 106 may generate web pages and archive files for a dynamic web page. A dynamic web page is a web page that is created in response to a request for a web page. Prior to the request the dynamic web page does not exist. In this embodiment, the archiver 106 generates a web page and an archive file dynamically in response to a request for the dynamic web page by a web client 112. For example, a web client 112 may request a web page from the web host 102 that includes data from the data store 108 and is created in response to the request. The archiver 106 may receive data from the data store 108 and generate a web page and an archive file for the web page. The generated web page and archive file may then be delivered by the web server application 104 to the web client 112.

A data store 108, in one embodiment, may be included in the web host 102. Data in the data store 108 may comprise complete web pages, data used to generate web pages, pre-defined archive files, and objects used to render web pages. For example, the data store 108 may comprise one or more hard disk drives containing data files. In another embodiment, the data store 108 comprises a database. In a further embodiment, the data store 108 comprises a flash memory device.

In one embodiment, the network 110 provides a medium for the transmission of data between the web host 102 and the web client 112. The network 110 may transmit requests from the web client 112 to the web host 102. The network 110 may also transmit generated web pages and archives from the web host 102 to the web client 112. The network 110 may be any network capable of transmitting such data, such as the Internet. Other examples of a network 110 include an intranet, a direct network connection, and the like. The web client 112, in one embodiment, renders the generated web page for display. The web client 112 may include a CPU 114, memory 116, and a script enabled browser 118. The web client 112 renders the generated web page using objects from an archive, in one embodiment.

The script enabled browser 118, in one embodiment, is a web browser capable of processing a script in a web page. Examples of scripts include Javascript™, VBScript™, a java applet, and ActiveX™. Examples of script enabled browsers 118 include Microsoft™ Internet Explorer™, Mozilla Firefox™, Apple™ Safari™, and Opera™.

In one embodiment, the script enabled browser 118 requests a web page from the web host 102. The web page may include references to one or more objects capable of being included in an archive file, referred to herein as archivable objects. The web host 102 may deliver a generated web page that references an archive file to the script enabled browser 118. The script enabled browser 118 may execute code, such as a script, embedded within the generated web page to retrieve the archive file from the web host 102. Additional executable code in the generated web page is executed by the script enabled browser 118 to unpackage the archivable objects from the archive file and render the web page using the archivable objects.

In one embodiment, the script enabled browser 118 is capable of accessing and unpackaging an archive file for a web page without further modification to the script enabled browser 118. In other words, there is no requirement to change the executable code (either original object code or added plug-ins or extensions) of the script enabled browser 118. For example, the script enabled browser 118 may be capable of executing JavaScript™. In this example, the script enabled browser 118 requests a web page from the web host 102 that has an associated archive file. The web host 102 may deliver a generated web page to the script enabled browser 118. The generated web page references the associated archive file. The script enabled browser 118 executes JavaScript™ code in the generated web page. The JavaScript™ code includes instructions to retrieve the archive file from the web host 102. Additional JavaScript™ code in the generated web page includes instructions that direct the script enabled browser 118 to unpackage the archivable objects from the archive file and render the web page using the archivable objects.

Figure 2:
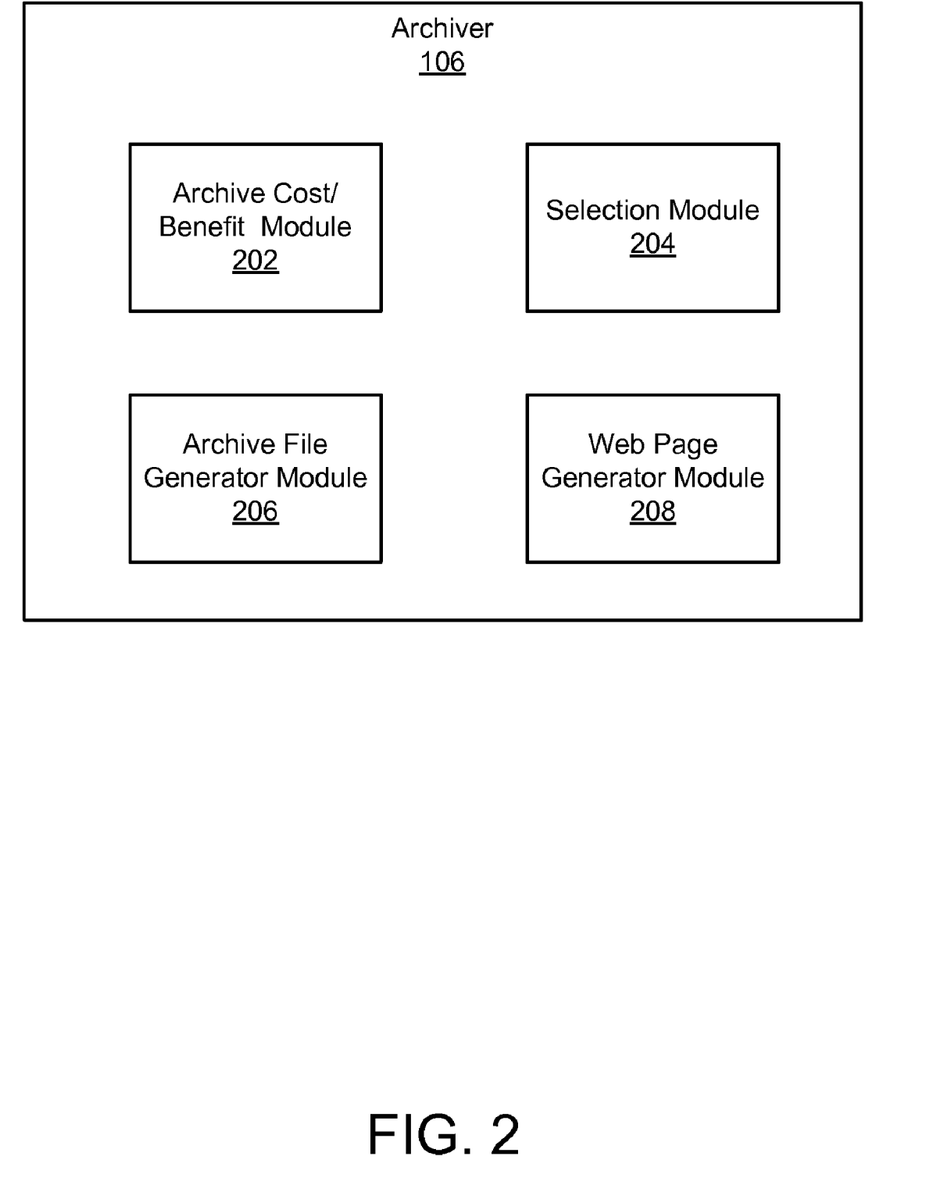
FIG. 2 is a schematic block diagram illustrating one embodiment of an archiver according to the present invention.

FIG. 2 illustrates one embodiment of an archiver 106. The archiver 106 may include an archive cost/benefit module 202, a selection module 204, an archive file generator module 206, and a web page generator module 208. The archiver 106 generates archive files and associated web pages with improved downloading time.

The archive cost/benefit module 202, in one embodiment, determines if a computational cost associated with generating an archive file and an associated web page outweighs a benefit of improved download time for the web page. If the projected improvement in downloading time outweighs the overhead cost associated with generating the web page and archive file, the archive cost/benefit module 202 may indicate that the archiver 106 should generate the web page and an associated archive file.

In certain embodiments, the archive cost/benefit module 202 may employ a heuristic function to determine if the web page and archive file should be generated. For example, the archive cost/benefit module 202 may project a computational cost for generating the web page and archive file. If the computational cost is below a threshold value, the cost/benefit module 202 may indicate that the archiver 106 should generate the web page and archive file. In an alternate embodiment, the archive cost/benefit module 202 may also project a value associated with an improvement in download time associated with the archive file and web page. The cost/benefit module 202 may indicate that the web page and archive file should be generated in response to a ratio between the projected computational cost and the projected benefit being below a threshold value.

In one embodiment, the determination made by the archive cost/benefit module 202 may be different for a web page that must be generated in response to a request for the page than for a web page that is generated asynchronously. For example, the archive cost/benefit module 202 may evaluate a static web page during a time of light load on the web host 102 and determine that an archive should be generated for the web page. After generating the archive, requests for the web page will result in the delivery of the asynchronously generated archive. If the request for the web page is received before the archive is generated, however, the archive cost/benefit module 202 may reach a different conclusion, since the archive would need to be generated while the requesting browser waits for the archive. The same web page may be determined by the archive cost/benefit module 202 to be too costly to generate when the web page must be generated in response to a request for the web page, or when the load on the web host 102 is relatively high.

The selection module 204, in one embodiment, selects objects referenced by the web page for inclusion in an archive file. The selection module 204 selects objects based on selection criteria that determine whether an object should be in an archive file rather than being delivered to the web client 112 separately. One example of a selection criterion is the size of the object, where an object with a smaller size is more likely to benefit from inclusion in an archive file than an object with a larger size. In one embodiment, the selection module 204 may select objects with a size below a threshold value. For example, the threshold value may be three kilobytes, and the selection module may select objects with a size below three kilobytes.

In one embodiment, the archive file generator module 206 generates one or more archive files associated with the web page. The archive file generator module 206 uses objects selected by the selection module 204 to form the one or more archive files. The one or more archive files are delivered to the web client 112 in response to requests made by the web client 112 after executing the executable code of the generated web page.

The web page generator module 208, in one embodiment, generates a web page configured for use with the one or more archive files. The web page generator module 208 may generate a web page including code for rendering the web page using objects from the one or more archive files. The rendering code may be a script, such as Javascript™, VBScript™, or the like. In one embodiment, the rendering code is executable code.

The code of the web page may include instructions for retrieving one or more archive files associated with the generated web page. In addition, the code may include instructions for unpackaging archive objects from the archive file. Furthermore, the code may include instructions for rendering the web page using the archive objects. Rendering may include displaying an unpackaged archive object at a position determined by the generated web page.

Figure 3:
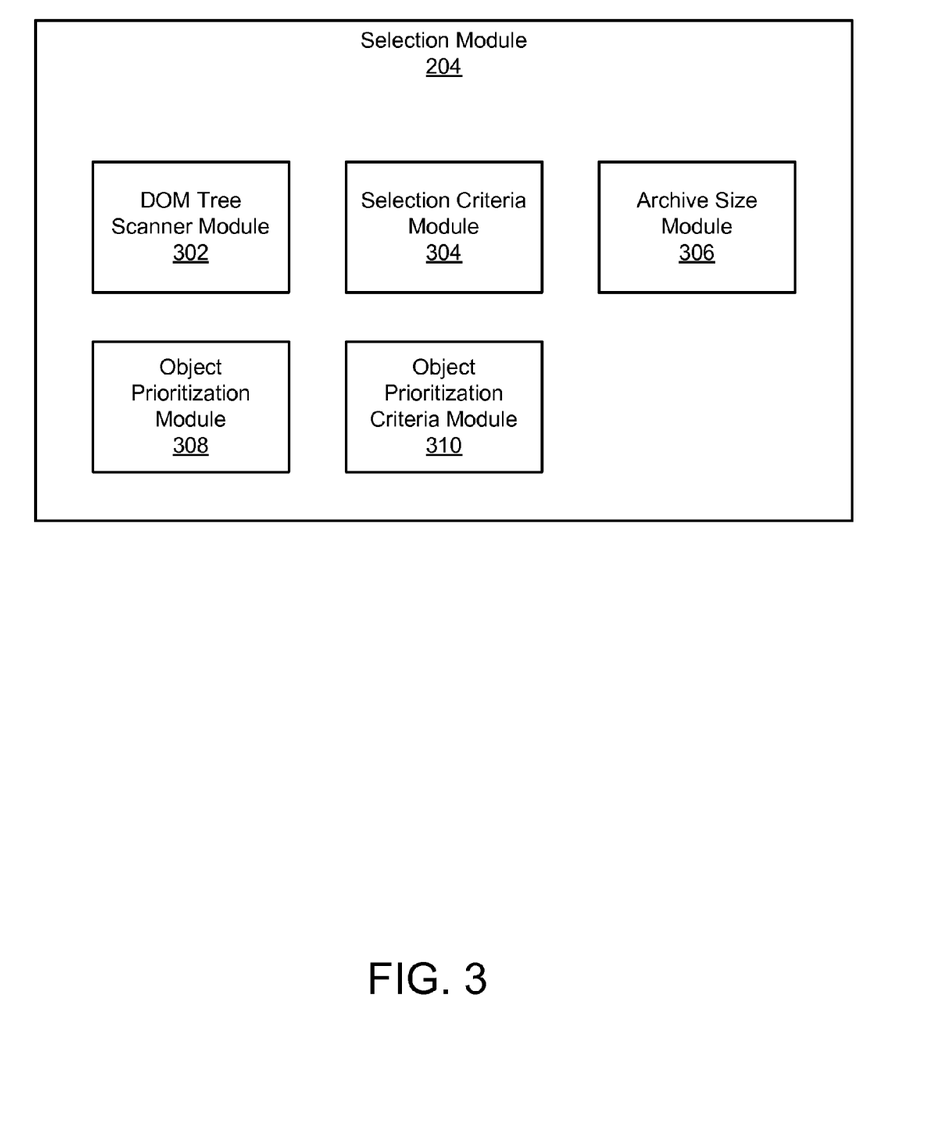
FIG. 3 is a schematic block diagram illustrating one embodiment of a selection module in accordance with the present invention.

FIG. 3 illustrates one embodiment of a selection module 204. The selection module 204 may include a document object model (DOM) tree scanner module 302, a selection criteria module 304, an archive size module 306, an object prioritization module 308, and an object prioritization criteria module 310. The selection module 204 selects archivable objects from the web page for inclusion in one or more archive files.

The DOM tree scanner module 302, in one embodiment, scans a DOM tree of a web page. The DOM tree defines the logical structure of the web page. Objects in the web page are arranged in a hierarchical structure in the DOM tree, with some objects depending from other objects, and all objects depending from a root object. By scanning the DOM tree with the DOM tree scanner module 302, the selection module 204 determines information about the objects in the web page such as what objects are referenced by the web page, the types of objects referenced in the web page, the size of the objects, and the relative dependencies between objects referenced in the web page.

In one embodiment, the selection criteria module 304 includes one or more selection criteria that determine whether an object is an archivable object. An archivable object is an object should be included in an archive. Objects referenced in the web page are judged according to the selection criteria to determine if they are archivable objects. Examples of selection criteria include a maximum size of the object and the type of the object. For example, a selection criteria module 304 may include a criterion that archivable objects should have a size less than three kilobytes. Another criterion may be that an archivable object must be an image file.

The archive size module 306, in one embodiment, determines a target size for an archive file. The archive size module 306 may determine the target size for the archive file by determining an overall size for the objects referenced in the web page and setting the target size to a fraction of that overall size. In one embodiment, the target size is one quarter of the overall size of the objects referenced in the web page. Most conventional web browsers are configured to open up to four simultaneous connections to a web server. As a result, an archive file that is larger than one quarter the overall size of the objects in the web page will result in diminishing returns to the performance benefit realized by creating an archive file.

In one embodiment, the object prioritization module 308 determines a priority for archivable objects referenced in the web page. The priority of objects may be determined by object prioritization criteria from the object prioritization criteria module 210. The priority determined by the object prioritization module 308 determines an order for archivable objects in an archive file. Archivable objects with a higher priority are ordered before archivable objects with a lower priority. For example, an archivable object defining a table in a web page may be assigned a higher priority than an archivable object consisting of an image in the table. Since the archivable object defining the table has a higher priority than the image, the archivable object defining the table is ordered before the image. By prioritizing and ordering archivable objects, the web page may be more efficiently rendered by placing the unpackaged archivable objects as they are unpackaged.

The object prioritization criteria module 310, in one embodiment, includes one or more object prioritization criteria that determine the priority of an object referenced in a web page. The object prioritization criteria relate to characteristics of the archivable objects referenced in the web page. For example, it may improve the rendering of the page to order objects higher in the DOM tree before objects that are lower in the DOM tree, as an object removed from the archive cannot be rendered before an object upon which it depends is available. Therefore, in one embodiment, a hierarchical level in the DOM tree of an archivable object is an object prioritization criterion. For example, an archivable object that has a relatively high hierarchical level, meaning that it is relatively fewer steps from the root of the DOM tree, may have a higher priority than an archivable object that has a relatively low hierarchical level, meaning that it is relatively more steps from the root of the DOM tree. Consequently, the archivable object with the higher priority is ordered within the archive such that it is unpackaged and rendered earlier.

For the same reason, in another embodiment, an object prioritization criterion may comprise a number of descendent objects in the DOM tree. For example an archivable object with a relatively large number of descendent objects may be assigned a higher priority than an archivable object with a relatively small number of descendent objects. The result of this criterion is an improvement in the likelihood of a prerequisite archivable object being available before a descendent archivable object is removed from the archive file.

The greatest increases in performance may be realized when the smallest objects are archived. Therefore, in one embodiment, the size of archivable objects is an object prioritization criterion. For example, if the total size of archivable objects exceeds an archive size determined by the archive size module 306, smaller archivable objects may be assigned a higher priority than relatively large archivable objects. As a result, the smaller archivable objects will be included in the archive file to improve the performance of the archive file. The relatively large archivable objects may not be placed in the archive due to the size constraint.

Figure 4:
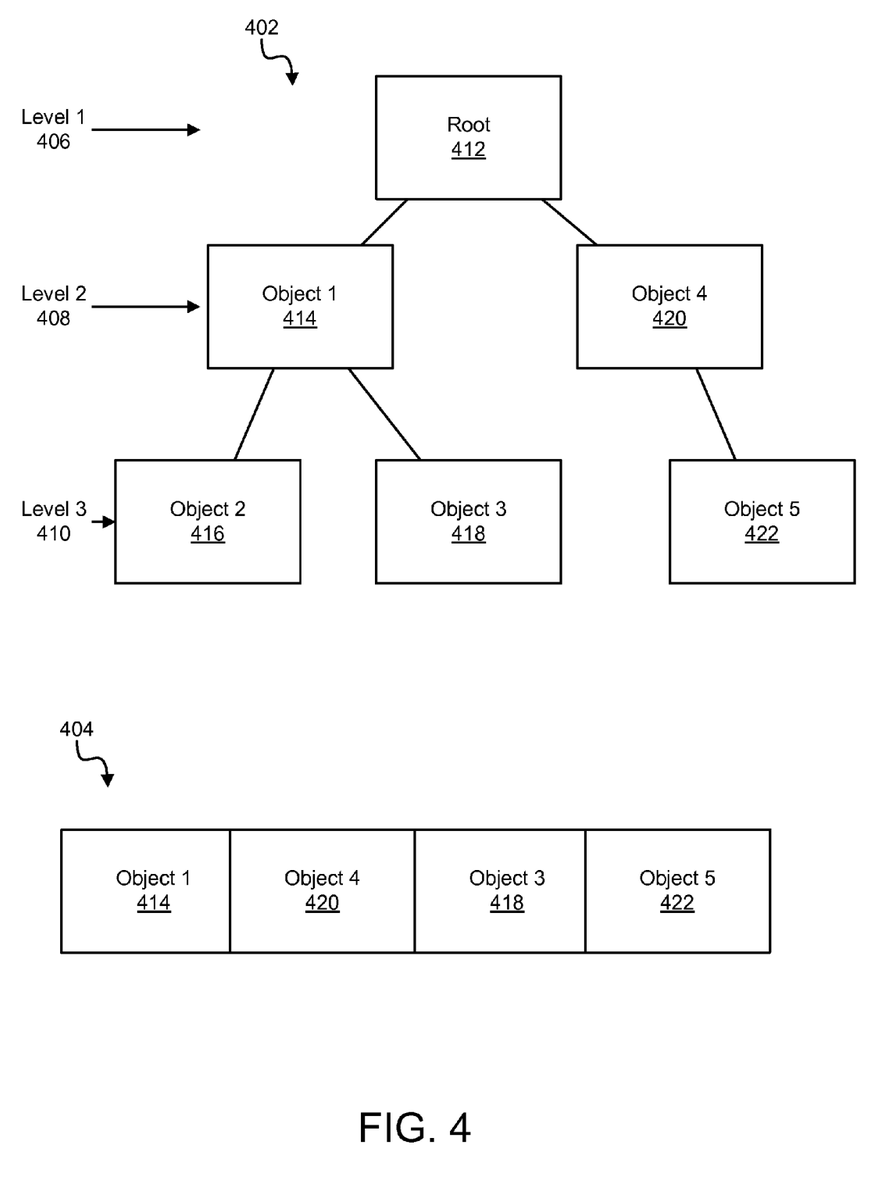
FIG. 4 is a schematic block diagram illustrating one embodiment of a document object model (DOM) tree and ordered archivable objects in accordance with the present invention.

FIG. 4 illustrates one embodiment of a DOM tree 402 for a web page and ordered archivable objects 404 for an archive file. The DOM tree 402 may include a plurality of objects 412-422 arranged in hierarchical levels 406-410. The DOM tree 402 is a representation of relationships between objects 412-422 in a web page. Objects in level 2 408 are dependent on objects in level 1 406, objects in level 3 410 are dependent on a prerequisite object in level 2 408, and so on. For example, object 2 416 in level 3 410 is dependent on object 1 414 in level 2 408.

In one embodiment, an object in a lower level cannot be properly rendered in the web page until the prerequisite object is rendered in the web page. For example object 1 414 may be a table in the web page, and object 2 416 may represent an image in the table of object 1 414. Since the image of object 2 416 is defined to be in the table of object 1 414, it cannot be rendered in the web page before the table is rendered.

As a result of these dependencies and other considerations, archivable objects selected by the selection module 204 may be prioritized and ordered by the object prioritization module 208 as ordered archivable objects 404. For example, the object selection module 204 may determine that object 1 414, object 3 418, object 4 420, and object 5 meet a set of selection criteria and designate these objects as archivable objects. The object selection module 204 may also determine that object 2 416 does not meet a set of selection criteria, for example, object 2 416 may have a size greater than a threshold value.

The selection module 204 may further order the archivable objects into ordered archivable objects 404. The object prioritization module 308 may order the archivable objects according to object prioritization criteria. For example, object 1 414 and object 4 420 may be assigned a high priority due to their relatively high position in the DOM tree 402 at level 2 408. Object 1 414 may be assigned a higher priority than Object 4 420 as object 1 414 has more dependent objects than object 4 420. As a result, Object 1 414 may be ordered before object 4 420 in the ordered archivable objects 404.

Figure 5:
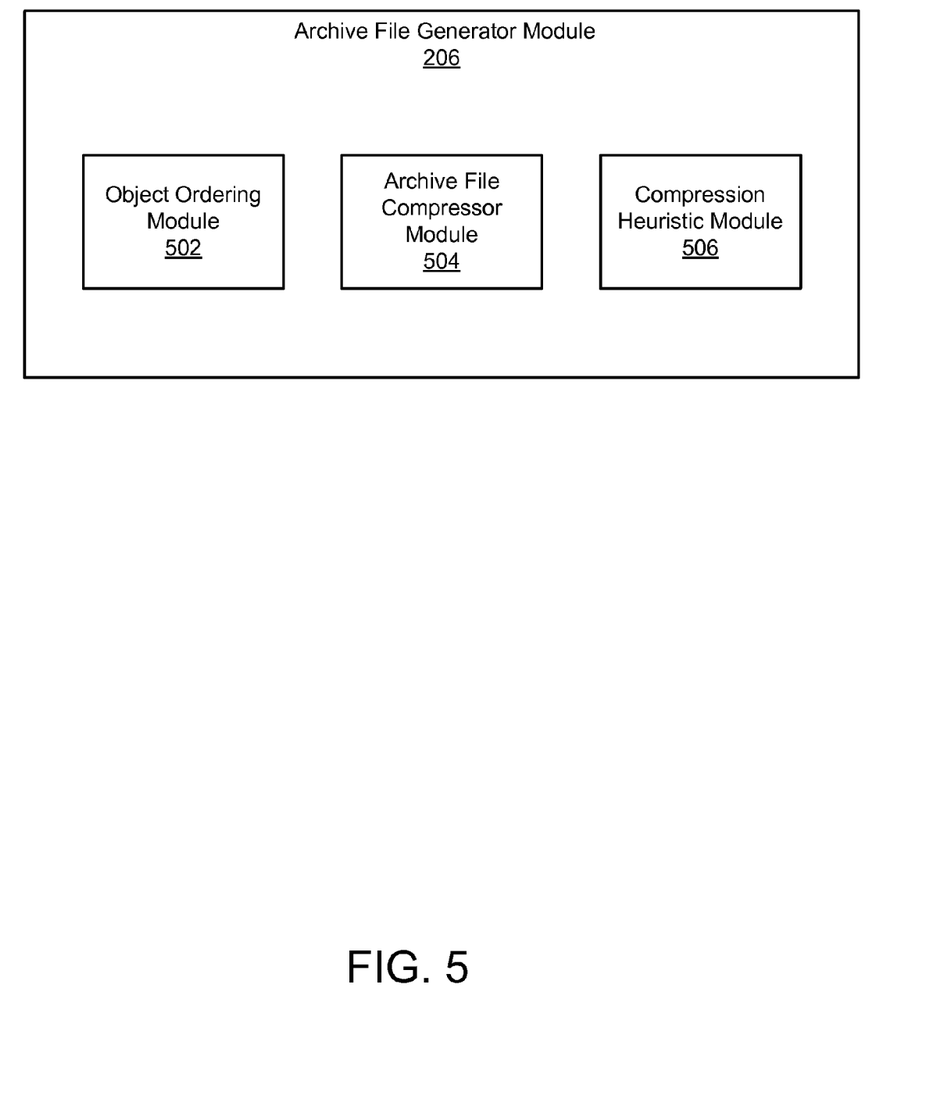
FIG. 5 is a schematic block diagram illustrating one embodiment of an archive file generator module in accordance with the present invention.

FIG. 5 illustrates one embodiment of an archive file generator module 206. The archive file generator module 206 may include an object ordering module 502, an archive file compressor module 504 and a compression heuristic module 506. The archive file generator module 206 generates archives files using archivable objects selected by the selection module 204.

The object ordering module 502, in one embodiment, orders archivable objects according to the priority of the archivable objects. The priority of the archivable objects may be determined by the object prioritization module 308 according to object prioritization criteria. The object ordering module 502 orders the archivable objects such that relatively high priority archivable objects are ordered before relatively low priority archivable objects in the generated archive file.

In one embodiment, the archive file compressor module 504 compresses the generated archive file. The file compressor module 504 may compress the generated archive file using any data compression method. Examples of data compression methods that may be used to compress the archive file include gzip, zip, LZX, arithmetic coding, and the like.

The archive file generator module 206 may rely on a compression heuristic module 506 to determine if a generated archive file should be compressed. Under certain circumstances, compressing the archive file may prove inefficient. For example, many image files, such as jpeg files, are pre-compressed. If the archivable objects that make up the archive file include a high proportion of pre-compressed image files, processing the archive file with an additional compressor will result in a computational cost, but a relatively modest improvement in the size of the archive file.

Another example of a circumstance in which a generated archive file should not be compressed occurs during archive file generation of dynamic web pages. When archive files are generated for dynamic web pages, the server load may be high on the web host 102. The computational cost and time required to compress the archive file while the requesting web client 112 waits may outweigh the reduction in size of the archive file.

In order to avoid attempts to compress a generated archive file when the cost of compression outweighs the benefit of reduction in size of the archive file, the compression heuristic module 506, in one embodiment, determines when an archive file should be compressed. For example the compression heuristic module 506 may determine a proportion of images in the archive file. When the proportion of images in the archive file is below a threshold level, the compression heuristic module 506 may determine that the archive file should be compressed.

Figure 6:
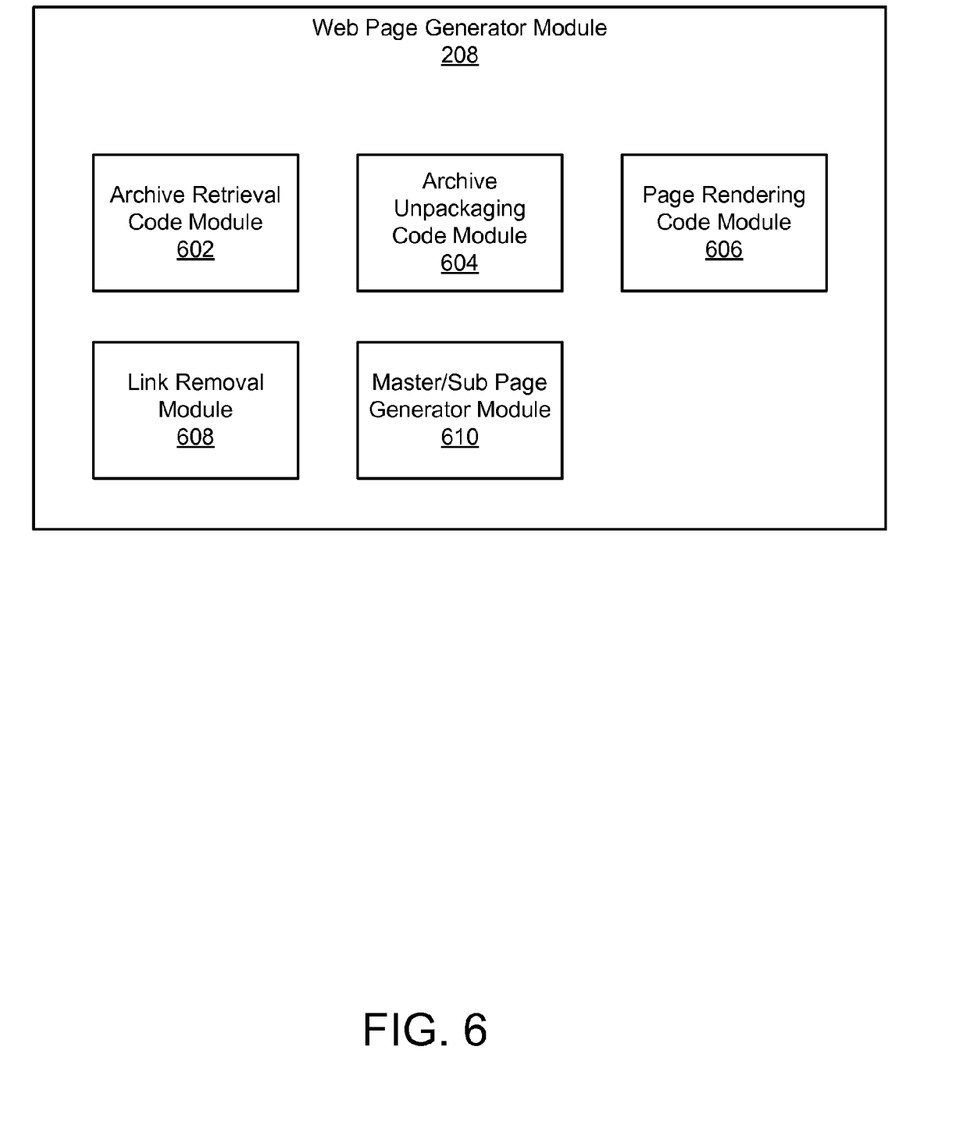
FIG. 6 is a schematic block diagram illustrating one embodiment of a web page generator module in accordance with the present invention.

FIG. 6 illustrates one embodiment of a web page generator module 208. The web page generator module 208 may include an archive retrieval code module 602, an archive unpackaging code module 604, a page rendering code module 606, a link removal module 608, and a master/sub page generator module 610. The web page generator module 208 generates a web page that uses an archive file.

The web page generator module 208, in one embodiment, may insert executable code for handling archive files into generated web pages. In one embodiment, the web page generated by the web page generator module 208 may be the first instance of the web page. For example, the web page may be generated dynamically in response to a request from a web client 112. In another example, the web page generator module 208 may generate the web page in response to a design of the web page by a web designer. In this example, the web page generator module 208 may be linked to or integrated with web design software.

In another embodiment, the web page generator module 208 may operate on an existing web page that does not include executable code for handling archive files. In this embodiment, an existing web page is rewritten to include executable code for handling an archive file. For example, the web page generator module 208 may access a static web page and rewrite the static web page so that it can be rendered using archivable objects from an archive file. In another example, the web page generator module 208 may operate on a dynamically generated web page that does not include executable code for handling an archive file. In this example, the dynamically generated web page is rewritten so that it can be rendered using archivable objects from an archive file.

The generated web page may include HTML tags linked to archivable objects in an archive file. For example, if the archive file name is "html.archive" and an archivable object name in the archive file is "obj1", a uniform resource identifier (URI) in the HTML tag may be "html.archive/obj1".

The archive retrieval code module 602, in one embodiment, adds executable code to the generated web page for retrieving an archive file. The executable code may be any type of code executable by a script enabled web browser, such as Javascript™, VBScript™ or the like. The executable code added to the web page by the archive retrieval code module 602 may cause a web client 112 to retrieve an archive file for the web page from the web host 102. Once retrieved, web client 112 store the archive file on a client device in temporary or persistent memory.

In one embodiment, the archive unpackaging code module 604 adds executable code to the generated web page for unpackaging an archive file. The executable code may be any type of code executable by a script enabled web browser, such as Javascript™, VBScript™ or the like. The executable code added to the web page by the archive unpackaging code module 604 may include instructions to cause the web client 112 to locate and unpackage the archive file retrieved.

Unpackaging the archive file, in one embodiment, comprises extracting archivable objects from the archive file. The unpackaging code instructs the client device to store the archivable objects in temporary or persistent memory. The archivable objects may be extracted in order, meaning that archivable objects are extracted in the order determined by the object prioritization module 308 or in the order determined by the object ordering module 502. In one embodiment, the archive file has been compressed by the archive file generator module 206. In this embodiment, the executable code added by the archive unpackaging code module 604 includes instructions for extracting the compressed archivable objects from the archive file.

In one embodiment, the page rendering code module 606 adds executable code to the generated web page for rendering the generated web page using archivable objects extracted from the archive file. The executable code may be any type of code executable by a script enabled web browser, such as Javascript™, VBScript™ or the like. The executable code added to the web page by the page rendering code module 606 may include instructions to cause the web client 112 to render the web page using archivable objects extracted from the archive file. Consequently, the web client 112 would not request the archivable objects from a web server.

In one embodiment, the page rendering code module 606 may insert executable code into the generated web page directing the script enabled browser 118 to handle tags in the generated web page referencing archivable objects in the archive file. For example, if the archive file name is "html.archive", an archivable object name in the archive file is "obj1", and a uniform resource identifier (URI) in the HTML tag is "html.archive/obj1", the executable code may cause the browser to access an archivable object extracted from the archive file named "obj1". The executable code may further cause the script enabled browser 118 to render the web page using the archivable object named "obj1" in the position indicated by the generated web page.

The link removal module 608, in one embodiment, removes direct links from the web page to objects that have now been placed in an archive file. For example, an existing web page may be processed by an archiver 106 and objects in the web page may be determined to be archivable objects. Archivable objects may be placed in an archive file by the archiver 106. In this example, the link removal module 608 may modify the web page by removing the links to the objects added to the archive file. The links may be replaced by tags enabling executable code added by a page rendering code module 606 to render the page using extracted archivable objects from the archive file instead of the linked objects.

The master/sub page generator module 610, in one embodiment, generates a web page for a master page and one or more sub pages that use archivable objects from an archive file. A master page is a web page that defines aspects of one or more sub pages or frames. The master/sub page generator module 610 may generate a sub page that accesses an archivable object extracted from an archive file retrieved for a master page. For example, a master page may include an image file for a logo that appears on the master page and all sub pages. The image file may be an archivable object and be part of an archive file for the master page. When the master page is accessed, the archive file is retrieved and the image file is extracted from the archive file. When a sub page is subsequently accessed, the sub page may include a tag from the master/sub page generator module 610 indicating that the script enabled browser 118 should reference the image file previously downloaded for the master page, rather than downloading the image file separately or in an archive file associated with the sub page.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
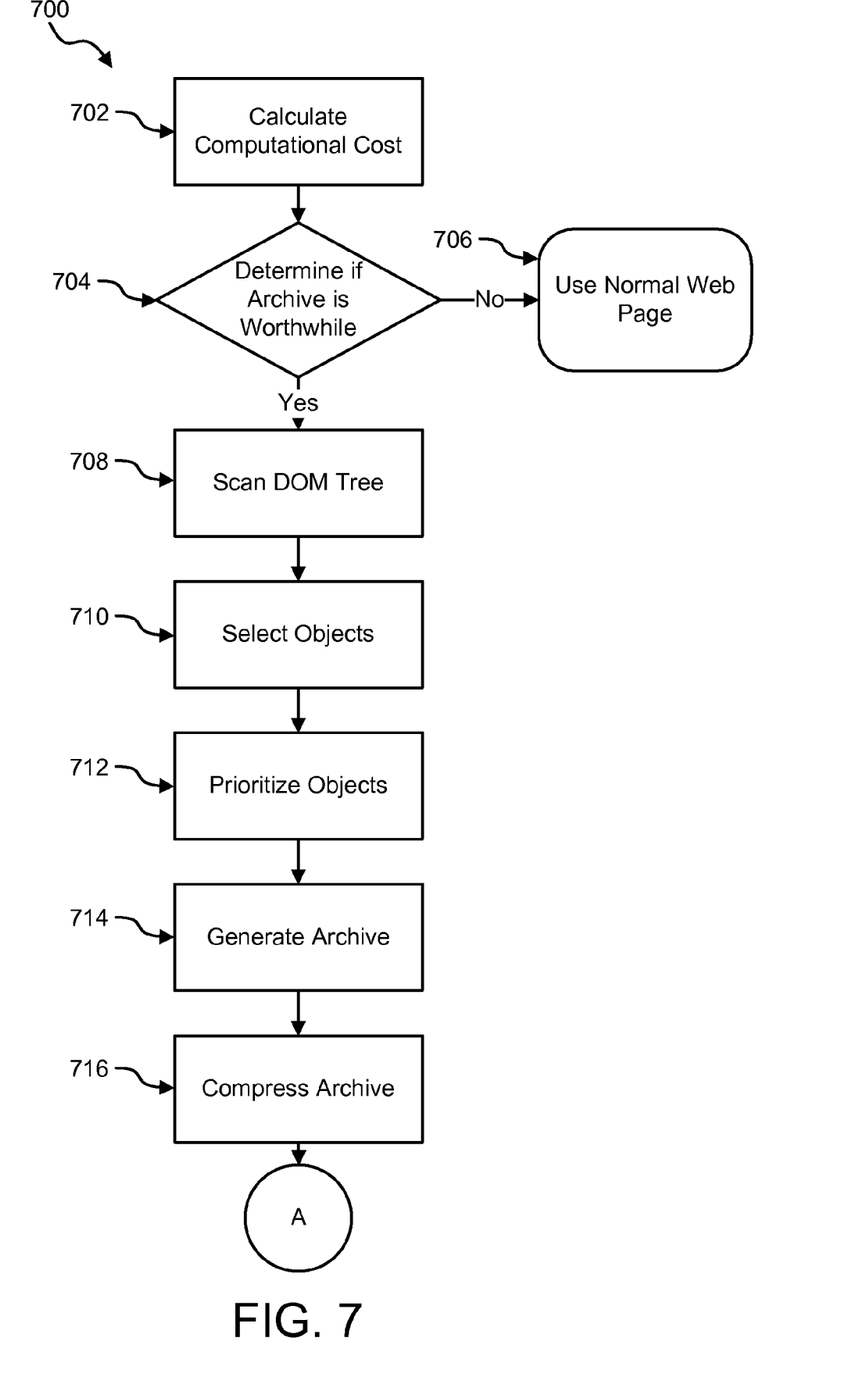
FIGS. 7 and 8 are a schematic flow chart diagram illustrating one embodiment of a method for improving the download time of a web page in accordance with the present invention.
Figure 8:
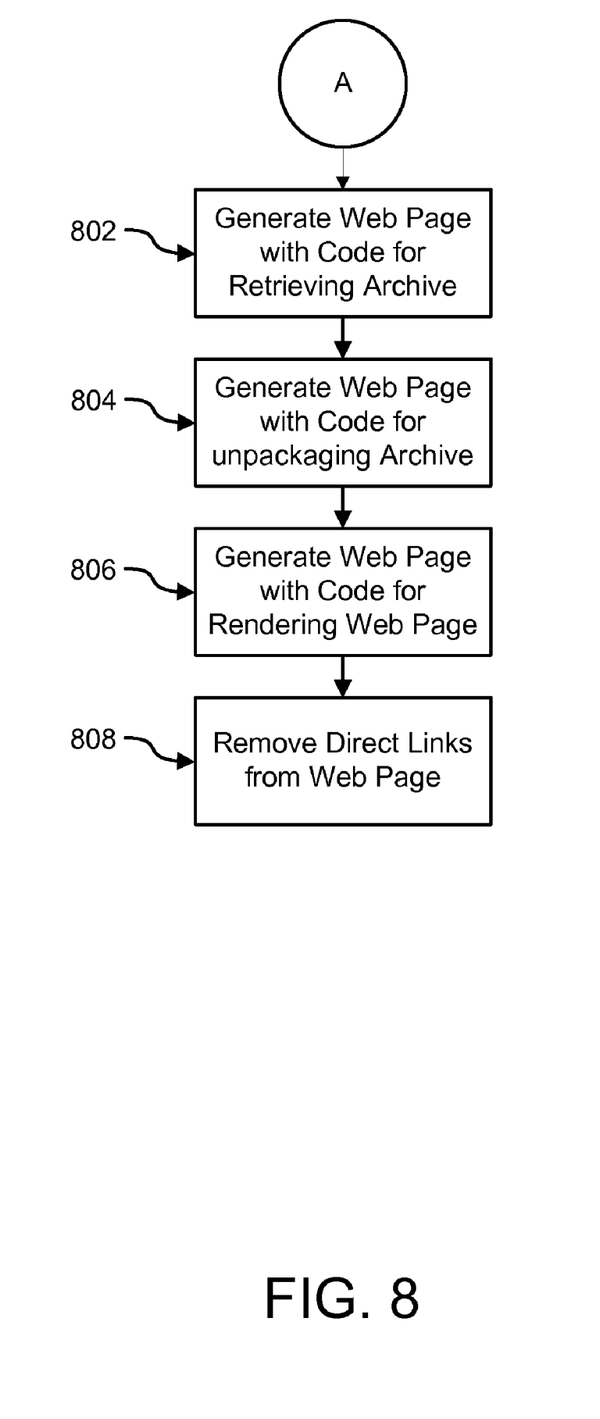

FIGS. 7 and 8 are a flow chart diagram showing the various steps in a method 700 for improving the download time of a web page. The method 700 is, in certain embodiments, a method used in the system and apparatus of FIGS. 1-6, and will be discussed with reference to those figures. Nevertheless, the method 700 may also be conducted independently thereof and is not intended to be limited specifically to the embodiments discussed above with respect to those figures.

As shown in FIG. 7, the method 700 calculates 702 a computational cost associated with generating an archive file for the web page. In one embodiment, the computational cost is a measure of the resources required to generate an archive file and a web page configured to access archivable objects in the archive file. In an alternate embodiment, the calculated 702 computational cost may be a ratio between a measure of the resources required to produce the archive file and web page and a measure of the improvement in the download time of the web page realized by using an archive file. In another embodiment, the calculated 702 computational cost may vary in response to parameters such as the load on the web host 102, whether the web page has already been requested by a web client 112, and whether the web page is a static web page.

The archive cost/benefit module 202 then determines 704 if generating an archive file for the web page is worthwhile in one embodiment. The determination 704 may be based on the calculated 702 computational cost and a threshold value. For example, the archive cost/benefit module 202 may determine that generating an archive is worthwhile when a ratio of computational cost to performance benefit is below a threshold value.

The method 700 uses 706 a normal web page if the determination 704 is negative. A normal web page is a web page that does not include references to an archive file. In one embodiment, the method 700 may generate a normal web page. In an alternate embodiment, the method 700 may use 706 an existing normal web page.

Next, the selection module 204 scans 708 a DOM tree representation of the web page if the archive cost/benefit module 202 determines 704 that an archive file should be generated. The DOM tree is scanned 708 to determine what objects are in the web page and other parameters about the object, such as size of the objects, hierarchical level of the objects, and dependencies between the objects.

The selection module 204 then selects 710 objects as archivable objects. Archivable objects are selected 710 in response to meeting object selection criteria, such as size or type of the object. For example, the selection module 204 may select 710 an object as an archivable object in response to the size of the object being less than three kilobytes.

The object prioritization module 308 the prioritizes 712 archivable objects selected 710 by the selection module 204 Prioritization 712 of the archivable objects is based on object prioritization criteria, such as relative height in the DOM tree, number of dependent objects, and the like. For example, one object may have a higher priority than another object because it has more dependent objects in the DOM tree.

The archive file generator module 206 then generates 714 an archive file using the archivable objects. The archivable objects in the generated 714 archive file may be ordered in the generated archive file according to the priority of the objects assigned during prioritization 712. As a result, an archivable object with a higher priority may appear in the archive before an object with a lower priority.

In one embodiment, the archive file compressor module 504 compresses 716 the generated 714 archive file. Compression 716 of the archive file may use any compression method, such as gzip, zip, LZX, arithmetic coding, or the like. Compression 714 of the archive file may occur in response to a determination that the file will benefit from compression. For example, the method 700 may determine that the archivable objects include a high proportion of already compressed image files, and therefore determine that the archive should not be compressed.

As shown in FIG. 8, the web page generator module 208 next generates 802 a web page with executable code for retrieving the archive file. The executable code may be any code that a script enabled browser 118 is capable of executing, such as JavaScript™, VBScript™, a Java applet, or the like. In one embodiment, the code may be executed on an industry standard browser without modification to the browser beyond enabling scripts. The executable code for retrieving the archive file causes a script enabled browser 118 to retrieve an archive file associated with the web page.

The web page generator module 208 may also generate 804 the web page with executable code for unpackaging the archive file. The executable code may be any code that a script enabled browser 118 is capable of executing, such as JavaScript™, VBScript™, a Java applet, or the like. In one embodiment, the code may be executed on an industry standard browser without modification to the browser beyond enabling scripts. The executable code for unpackaging the archive file causes a script enabled browser 118 to unpackage the archive file associated with the web page.

The web page generator module 208 may also generate 806 the web page with executable code for rendering the web page using archivable objects from the archive file. The executable code may be any code that a script enabled browser 118 is capable of executing, such as JavaScript™, VBScript™, a Java applet, or the like. In one embodiment, the code may be executed on an industry standard browser without modification to the browser beyond enabling scripts. The executable code for rendering the web page using archivable objects from the archive file causes a script enabled browser 118 to render the web page using archivable objects from the archive file associated with the web page.

The web page generator module 208, in one embodiment, may also remove 808 direct links to archivable objects in the web page. For example, an archivable object in a web page may be included in an archive for the web page. The web page may then be generated with the link to the object removed 808. In a further embodiment, the method 700 may include adding a tag to the web page linked to the archivable object in the archive file in the place of the removed 808 direct link.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code programmed for improving the loading time of a web page, the operations of the computer program product comprising:
    generating an archive file from a plurality of archivable objects in a web page;
    compressing the archive file in response to a determination that a proportion of pre-compressed archivable objects of the plurality of archivable objects in the archive file is below a threshold level; and
    inserting executable script instructions into the web page, the executable script instructions retrieving the archive file, unpackaging the plurality of archivable objects from the archive file, and rendering the web page in a web browser using the unpackaged plurality of archivable objects.

2. The computer program product of claim 1, wherein inserting the executable script instructions into the web page comprises rewriting an existing web page.

3. The computer program product of claim 1, further comprising scanning a document object model (DOM) tree of the web page to determine the plurality of archivable objects in the web page.

4. The computer program product of claim 1, further comprising selecting the plurality of archivable objects from the web page wherein each archivable object selected has a size less than a threshold value.

5. The computer program product of claim 4 wherein the threshold value is three kilobytes.

6. The computer program product of claim 1, further comprising selecting the plurality of archivable objects from the web page such that the generated archive file is less than one quarter a size of the web page.

7. The computer program product of claim 1, further comprising selecting the plurality of archivable objects from the web page by prioritizing archivable objects for inclusion in the archive file based on one or more prioritization criteria.

8. The computer program product of claim 7 wherein the one or more prioritization criteria comprises a number of descendent objects of a selected archivable object in a document object model (DOM) tree.

9. The computer program product of claim 7 wherein the one or more prioritization criteria comprises a hierarchical level of a selected archivable object in a document object model (DOM) tree.

10. The computer program product of claim 7 wherein generating the archive file further comprises ordering the plurality of archivable objects in the archive file according to the prioritization criteria of the archivable objects.

11. A system for improving the loading time of a web page, the system comprising:
   an archiver comprising:
      an archive generator module configured to generate an archive file from a plurality of archivable objects in a web page;
      an archive file compressor module configured to compress the archive file in response to a determination that a proportion of pre-compressed archivable objects of the plurality of archivable objects in the archive file is below a threshold level; and
      a web page generator module configured to insert executable script instructions into the web page to retrieve the archive file, unpackage the plurality of archivable objects from the archive file, and render the generated web page using the unpackaged plurality of archivable objects;
   a web server application configured to deliver the web page and the archive file over a network; and
   a web host configured to operate the web server application, the web host comprising a computing device that is accessible over a network, the computing device comprising a central processing unit and memory.

12. The system of claim 11, wherein the web page generator module removes direct links to the plurality of archivable objects from the web page.

13. The system of claim 11, wherein the web page is a master page.

14. The system of claim 13 wherein the web page generator module rewrites a sub page to use an archivable object from an archive file retrieved for a master page.

15. The system of claim 11, wherein the pre-compressed archivable objects in the archive file comprise one or more images in the archive file.

16. A method for deploying computing infrastructure comprising integrating computer-readable code into a computing system, wherein the code in combination with the computing system is capable of performing the following:
   generating an archive file from a plurality of archivable objects in a web page;
   compressing the archive file in response to a determination that a proportion of pre-compressed archivable objects of the plurality of archivable objects in the archive file is below a threshold level; and
   inserting executable script instructions into the web page, the executable script instructions retrieving the archive file, unpackaging the plurality of archivable objects from the archive file, and rendering the web page in a web browser using the unpackaged plurality of archivable objects.

17. The method of claim 16, wherein the web page is a static web page.

18. The method of claim 16, wherein one or more archive files are generated for the web page before a request for the web page is received.

19. The method of claim 16, wherein the web page is a dynamically generated web page and the archive file is generated dynamically.

20. The method of claim 19, wherein the archive file is generated in response to a determination that a measure of computational cost for generating the archive file for a dynamic web page is less than a threshold value.

21. A computer program product comprising a computer readable medium having computer usable program code programmed for improved loading time of web pages, the operations of the computer program product comprising:
   requesting a web page having a plurality of archivable objects for inclusion in an archive file;
   receiving the web page, the web page comprising executable script instructions to retrieve the archive file, decompress the archive file in response to the archive file being compressed in response to a determination that a proportion of pre-compressed archivable objects of the plurality of archivable objects in the archive file is below a threshold level, unpackage the plurality of archivable objects from the archive file, and render the web page in a web browser using the unpackaged plurality of archivable objects; and
   executing the executable script instructions from within the web page to retrieve the archive file, decompress the archive file in response to the archive file being compressed in response to a determination that a proportion of pre-compressed archivable objects of the plurality of archivable objects in the archive file is below a threshold level, unpackage the plurality of archivable objects from the archive file, and render the web page in a web browser using the unpackaged plurality of archivable objects.

22. The computer program product of claim 21 wherein executing the executable script instructions to render the web page further comprises executing the executable script instructions to render an archivable object in a sub page from an archive file downloaded for a master page.

23. The computer program product of claim 21 wherein executing the executable script instructions to unpackage the plurality of archivable objects from the archive file further comprises executing the executable script instructions to unpackage the plurality of archivable objects in order.

* * * * *